US007085623B2

(12) United States Patent
Siegers

(10) Patent No.: US 7,085,623 B2
(45) Date of Patent: Aug. 1, 2006

(54) METHOD AND SYSTEM FOR USING SHORT RANGED WIRELESS ENABLED COMPUTERS AS A SERVICE TOOL

(75) Inventor: Johan Siegers, Amersfoort (NL)

(73) Assignee: ASM International NV (NL)

( * ) Notice: Subject to any disclaimer, the term of this patent is extended or adjusted under 35 U.S.C. 154(b) by 0 days.

(21) Appl. No.: 10/222,229

(22) Filed: Aug. 15, 2002

(65) Prior Publication Data

US 2004/0034448 A1 Feb. 19, 2004

(51) Int. Cl.
*G06F 19/00* (2006.01)

(52) U.S. Cl. .......................... 700/245; 700/19; 700/23; 700/83; 700/86; 318/568.11; 318/568.12; 318/568.16; 318/587; 901/1; 701/23; 701/25

(58) Field of Classification Search .................. 700/17, 700/19, 23, 83, 86, 96, 108, 116, 117, 235, 700/245, 249, 254, 257, 259, 262, 264; 318/568.11, 318/568.12, 568.16, 575, 587, 628; 901/1, 901/2, 8, 15, 17, 29, 48; 709/202, 217, 226, 709/230, 310; 701/23, 25
See application file for complete search history.

(56) References Cited

U.S. PATENT DOCUMENTS

| 4,149,237 | A | * | 4/1979 | Freitas ........................... 700/9 |
| 4,152,760 | A | * | 5/1979 | Freitas et al. ................... 700/9 |
| 6,167,464 | A | | 12/2000 | Kretschmann | |
| 6,490,493 | B1 | * | 12/2002 | Dharnipragada ............. 700/97 |
| 6,618,754 | B1 | | 9/2003 | Gosling | |
| 6,622,925 | B1 | | 9/2003 | Carner et al. | |
| 6,640,145 | B1 | * | 10/2003 | Hoffberg et al. ............... 700/83 |
| 2001/0003191 | A1 | * | 6/2001 | Kovacs et al. .............. 709/226 |
| 2001/0035729 | A1 | | 11/2001 | Graiger et al. | |
| 2002/0016829 | A1 | * | 2/2002 | Defosse ....................... 709/217 |
| 2002/0136214 | A1 | * | 9/2002 | Do et al. .................... 370/392 |
| 2002/0151327 | A1 | * | 10/2002 | Levitt .......................... 455/556 |
| 2002/0174106 | A1 | * | 11/2002 | Martin .......................... 707/3 |
| 2002/0181612 | A1 | * | 12/2002 | Warble et al. ............... 375/297 |
| 2003/0109951 | A1 | * | 6/2003 | Hsiung et al. .............. 700/108 |

FOREIGN PATENT DOCUMENTS

| WO | WO 91/04522 | * | 4/1991 |
| WO | WO 01/20572 A1 | | 3/2001 |
| WO | WO 01/71685 A1 | | 9/2001 |

OTHER PUBLICATIONS

Kumar et al. Bringing the benefits of Java to Bluetoot, 2002, Internet, pp. 1-3.*
Brewin, UPS to deploy Bluetooth, wireless LAN network, 2001, Internet, pp. 1-5.*
Kjesbu, ABB Corporate Research, 2002, Internet, pp. 1-.*

* cited by examiner

*Primary Examiner*—Thomas G. Black
*Assistant Examiner*—McDieunel Marc
(74) *Attorney, Agent, or Firm*—Allen J. Moss; Squire, Sanders & Dempsey L.L.P.

(57) ABSTRACT

A handheld device for use in a wireless environment to operate an apparatus is provided. The handheld device sends a request to an apparatus controller to initiate a maintenance sequence. The handheld device receives information from the apparatus controller to control the operation of the maintenance sequence. The handheld device sends a maintenance command to the apparatus controller. The handheld device then receives information regarding the state of the apparatus after the maintenance command is executed.

17 Claims, 5 Drawing Sheets

METHOD AND SYSTEM FOR USING SHORT RANGED WIRELESS ENABLED COMPUTERS AS A SERVICE TOOL

TECHNICAL FIELD OF THE INVENTION

This invention relates to the maintenance and control of machinery and more specifically to a method and system for using short ranged wireless enabled computers as a service tool.

BACKGROUND OF THE INVENTION

In industrial and manufacturing facilities complex machines need to be adjusted and repaired. These adjustments are often difficult, requiring two or more people to manipulate machinery and make other changes. This is especially true in situations where the control for a machine is located remotely from the part or parts being adjusted or repaired. For example, in the semiconductor manufacturing industry furnaces are used to process semiconductor wafers. These wafers are loaded on to cassettes that are manipulated by a cassette-handling robot. The cassettes are stored in a stocker. The cassette-handling robot needs to be trained to learn the stocker positions where the cassettes will be stored. In order to do this an operator uses a touch-screen control panel to move the cassette-handling robot. Then the operator (or a second operator) needs to climb a ladder to look inside the machinery to verify the movement and position of the cassette-handling robot. After that is done, the operator goes back to the touch-screen control panel to move the cassette handling robot again. This needs to occur several times and is a very labor intensive process. One solution would be to provide a second touch-screen closer to the robot to control the cassette-handling robot. However, such a touch-screen would be complex and difficult to implement. What is needed is a convenient handheld wireless control unit.

SUMMARY OF THE INVENTION

The present invention provides for a method and system for using a short ranged wireless enabled computer as a service tool. In one embodiment a handheld device for use in a wireless environment to operate an apparatus is provided. The handheld device sends a request to an apparatus controller to initiate a maintenance sequence. The handheld device receives information from the apparatus controller to control the operation of the maintenance sequence. The handheld device sends a maintenance command to the apparatus controller. The handheld device then receives information regarding the state of the apparatus after the maintenance command is executed.

In another embodiment a method for performing maintenance on an individual apparatus is provided. In a first step, a request for control of the apparatus is sent wirelessly from a handheld device. Information regarding control of the apparatus is then sent to the handheld device. The device sends a maintenance command and receives an update regarding the status of the apparatus.

Technical benefits of the invention include the use of wireless communication to allow the user to operate machinery anywhere. Also, the ability to program standard handheld computers provides a cost benefit. By providing only a subset of the control program on the handheld device, storage space is saved and execution times decreased. Also, by sending the control application only when needed, the operator is assured of always having the latest software load. Other technical benefits are apparent from the following description and claims.

DETAILED DESCRIPTION OF THE DRAWINGS

In the following descriptions, an embodiment using a wireless controller to control a semiconductor furnace is used. While this embodiment is described, it is clear to one skilled in the art that the invention maybe used in many different applications to control many different types of apparatus and machinery.

Figure 1:
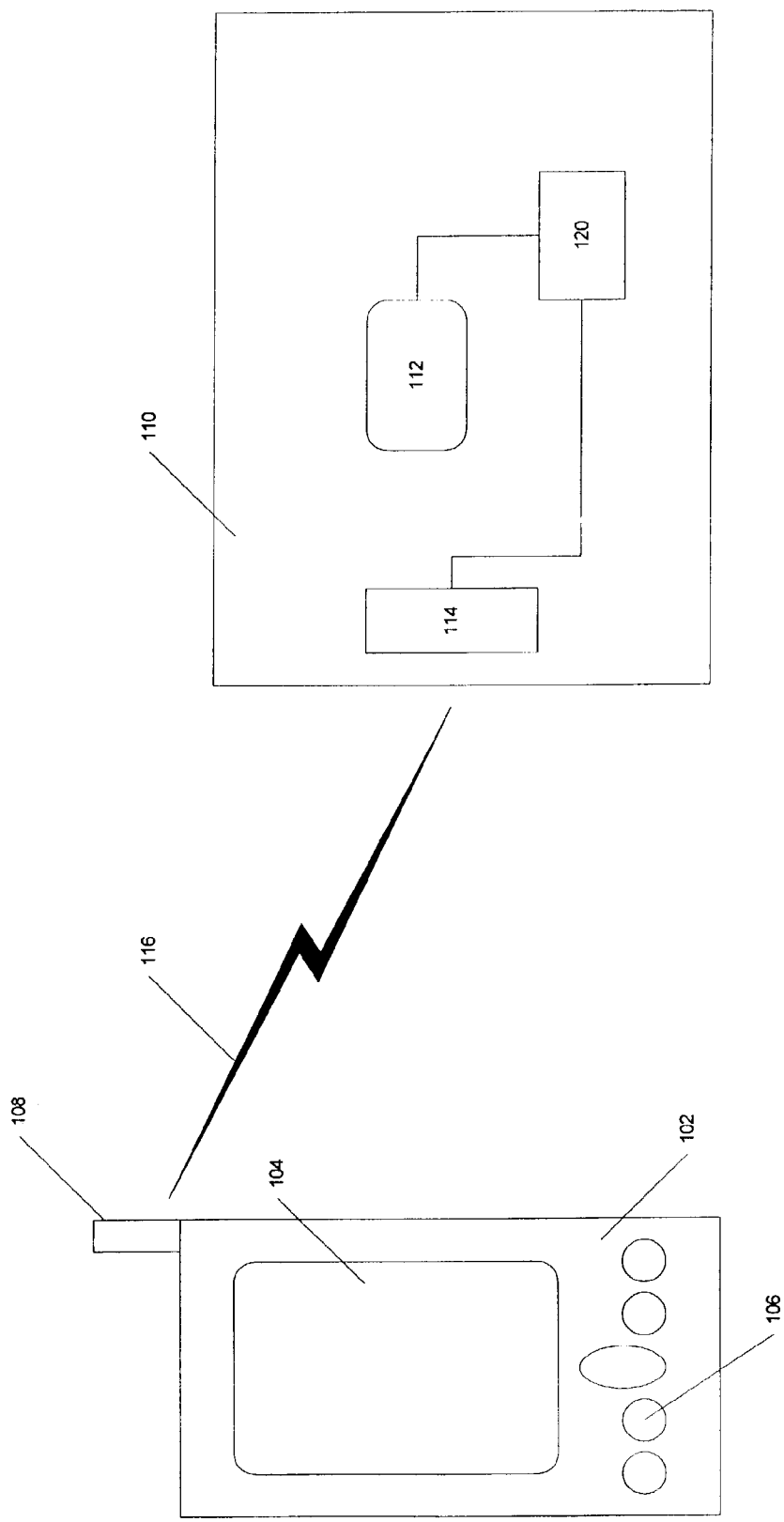
FIG. 1 illustrates an exemplary handheld device in communication with a semiconductor furnace.

FIG. 1 illustrates an exemplary handheld device 102, which is in communication with, and will be used to adjust, semiconductor furnace 110. Handheld device 102 is in communication with semiconductor furnace 110 via a wireless link 116.

Handheld device 102 is any handheld device capable of sending and receiving messages wirelessly and capable of executing applications and programs. For example, handheld device 102 can be any commercially available handheld device or personal digital assistant such as the Palm m515 manufactured by Palm, Inc. of Santa Clara, Calif. the Handspring Treo 90 manufactured by Handspring, Inc. of Mountain Valley, Calif. or the Compaq Ipaq manufactured by Compaq Computers of Houston, Tex.

Handheld device 102 may also be a proprietary handheld device. Handheld device includes a screen 104, which can be a grayscale or color LCD screen. Screen 104 is typically touch sensitive, which allows the user to select certain menu choices in a program by touching the screen with a stylus or a finger of the user. Typically, screen 104 will allow a user with a stylus to input text using handwriting that is interpreted to the correct text letter. This allows for text input to a program or application.

Handheld device 102 also contains a plurality of keys 106. These keys 106 can be used for data input or to launch programs. In some embodiments, keys 106 can be a keyboard to facilitate alpha-numerical character entry or any data entry incase a touch screen interface is not provided. Alternatively, handheld device 102 can have voice recognition capability, allowing commands to be entered by speaking them.

Antenna 108 is used to send and receive wireless information between the handheld device 102 and the semiconductor furnace 110. Antenna 108 is coupled to a transceiver, discussed further in FIG. 3.

Semiconductor furnace 110 is a furnace used for diffusion, oxidation and vapor deposition application. An example of a semiconductor furnace is the A412 furnace manufactured by ASM International, N.V. The semiconductor furnace 110 includes a furnace controller 120, which controls the operation of the semiconductor furnace 110. Connected to furnace controller 120 is control panel 112 to input data and commands into the furnace controller 120 and to receive data from the furnace controller 120. The control panel 112 in one embodiment is a touch screen control panel. However, a keyboard or other input device in conjunction with a standard monitor may also be employed.

Wireless transceiver 114, connected to furnace controller 120 is also included. Wireless transceiver 114 can be any device operable to send and receive data and applications between the controller of the semiconductor furnace and the handheld device, using radio frequency signals, infrared signals or any other means of wireless communication.

Wireless link 116 can be a method of wireless communication. In one embodiment wireless link 116 utilizes Bluetooth Wireless Specification equipment. The Bluetooth standard is an open standard for short-range transmission of digital voice and data between mobile devices (laptops, personal digital assistants, phones) and desktop devices. It supports point-to-point and multipoint communication applications. The Bluetooth standard provides up to a 720 Kbps data transfer rate within a range of 10 meters and up to 100 meters with a power boost. It uses omnidirectional radio waves that can transmit through walls and other non-metal barriers. The Bluetooth standard transmits in the unlicensed 2.4 GHz band and uses a frequency hopping spread spectrum technique that changes its signal 1600 times per second. If there is interference from other devices, the transmission does not stop, but transmission speed is downgraded. Other wireless standards may also be employed such as wireless LAN standards. For example, 802.11b wireless networking can be used. 802.11b uses the 2.4 GHz band and is known as wireless fidelity or "Wi-Fi".

In operation, handheld device 102 is in wireless communication with semiconductor furnace 110. Handheld device 102 will either have stored on it or will receive from the furnace controller 120 of the semiconductor furnace 110 a subset of the control program of the semiconductor furnace. In one embodiment, certain components of the control program will be preloaded on the handheld device and other components are received when needed from the furnace controller. This allows a user operating the handheld device to send commands from the handheld device 102 to the furnace controller 120 to manipulate the working of the semiconductor furnace 110, including moving a robot arm. In one embodiment, the user of handheld device 120 sends commands to control the wafer handling robot of the semiconductor furnace in order to train the robot the positions on a cassette stocker where cassettes of semiconductor wafers will be placed. By having a remote, wireless access, the user can visually verify the correct positioning of the robot before sending another movement command to the robot. This is advantageous because an operator at the furnace controller would be unable to se the position of the robot and would either have to move to verify positioning or rely on a second person. This is only one example of a process that can be controlled by the handheld device 120. Handheld device 102 can also receive information from furnace controller 120 such as process parameters.

Figure 2:
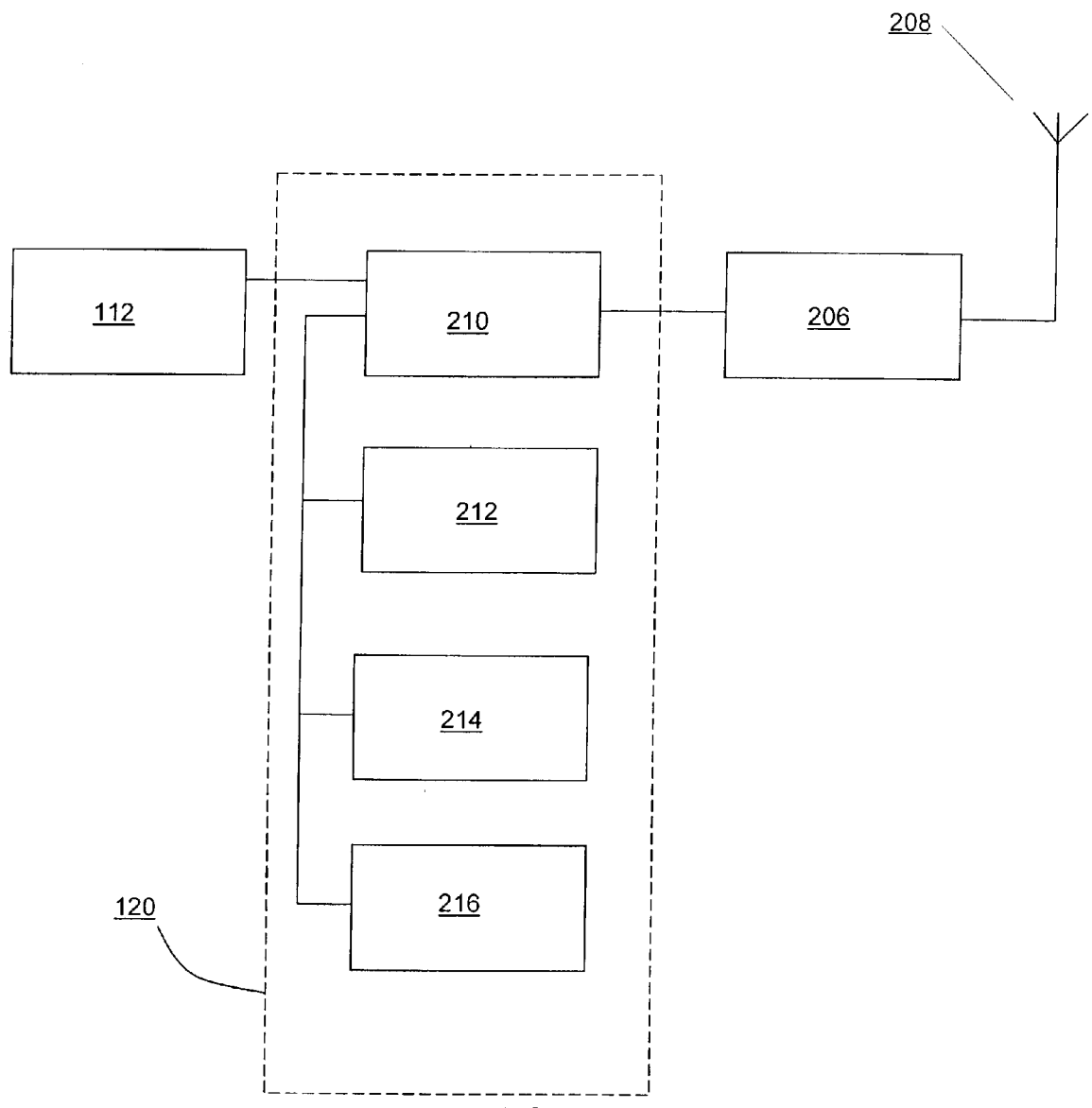
FIG. 2 illustrates the control system of the semiconductor furnace.

FIG. 2 illustrates the control system of the semiconductor furnace 110 in more detail. Furnace controller 120 is indicated by the dotted line and comprises a number of subcontrollers. Shown is Master Control Station 210, coupled to a process controller 212, a temperature controller 214 and a robot controller 216. Master Control Station 210 is also coupled to Bluetooth access point 206 and an antenna 208.

Master Control Station 210 in one embodiment is a PC-based control station running an operating system such as OS2, a product of IBM. Of course, other processors and operating systems can be used. The touch screen 112 is the user input for the Master Control Station 210. In other embodiments, other user input devices such as keyboards, mice or voice recognition systems can be used.

Bluetooth access point 206 is a Bluetooth compatible transceiver that is capable of wireless transmissions and receptions using the Bluetooth Standard. Of course, if another wireless protocol were used, a different type of access point would be utilized. Bluetooth access point 206 is coupled to an antenna 208 of known design.

Process controller 212 is responsible for controlling the execution of the process program running in the process chamber. Process controller 212 can control apparatus that control among other things the introduction and removal of chemicals and other materials in a process chamber. For example, process controller 212 can control a mass flow controllers and valves, among other control apparatuses, in order to control the processes in the process chamber.

Temperature controller 214 is responsible for monitoring and regulating the temperature in the process chamber. Temperature controller 212 monitors temperature sensors and can control heating elements to raise or lower temperatures in the process chamber.

Robot controller 216 controls the robots within the semiconductor furnace 110. Robot controller 216 can control the movement of one or more robots such as a cassette-handling robot and a wafer-handling robot.

In the present invention control and monitoring of these controls can be transferred to the handheld device 102 and monitored and operated remotely. Although in FIG. 2 a specific control architecture is shown, the present invention is not limited to this specific configuration. So it is possible that a larger or smaller number of controllers may be present or that all control functions are carrier out by one central control unit. In case of multiple controllers they can be connected in any way known in the art such as via a network. In addition, more than one user interface might be present to provide for a user interface at multiple locations such as at multiple sides of the system. Further, in addition to the process control devices shown (mass flow controller, valve temperature sensor, heater, robot) other sensors and actuators are possible such as pressure sensors, position sensors, concentration sensors, relays, lamps, sound alarms, etc. Additionally, the present invention is not limited to the control of semiconductor furnaces. Any commercial or industrial apparatus that is run, at least partially, under the control of a controller can be adapted to the present invention. These include food processing plants and automotive manufacturers.

Figure 3:
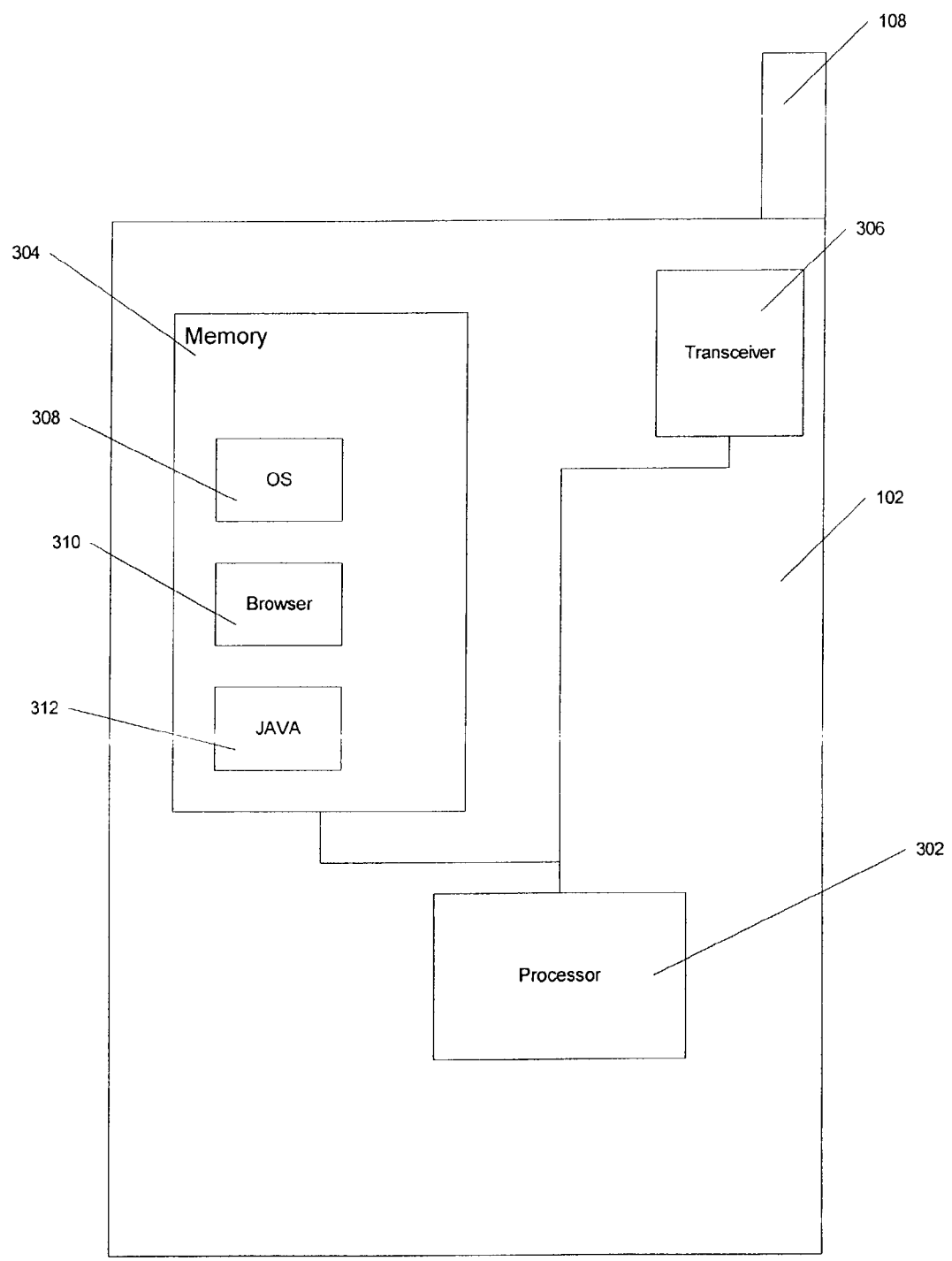
FIG. 3 is a block diagram of components of a handheld device.

FIG. 3 is a block diagram of components of handheld device 102. Handheld device 102, in one embodiment, includes a processor 302, memory 304, and a transceiver 306 coupled to antenna 108.

Processor 302, under control of an operating system (OS) 308, controls the operation of handheld device 110. Processor 302 can be any of a number of processors including those manufactured by INTEL, MOTOROLA or HITACHI. Processor 302 communicates control, address and data signals with the operating system 308 and with other components of the handheld device 102. Processor 302 interprets and executes instructions that have been fetched or retrieved from memory 304. This includes programs such as browser 310 and Java Virtual Machine 312. Processor 302 may be implemented as a single or multiple integrated circuits.

Transceiver 306 is any device capable of receiving and sending data wirelessly. In one embodiment, transceiver 306 is a Bluetooth capable transceiver. Other wireless standards, such as the wireless LAN standard, such as 801.11b can also be used.

Memory 304 may be implemented as volatile or nonvolatile memory, random access memory ("RAM"), read-only memory ("ROM"), flash memory or other types of memory. Operating system 308, browser 310 and/or a JAVA virtual machine 312 are stored in and operated within memory 304.

Operating system 308 can be any operating system capable of running a handheld device 102 such as the PALM OS and WINDOWS CE.

Browser 310 in this embodiment is any program capable of interacting or running JAVA applets or similar programs. Browser 310 can be a program such as a general web browser or can be an applet viewer. A general web browser is capable of interpreting a markup language such as the hypertext markup language (HTML) used in web page as well as running JAVA applets. An applet viewer typically just runs an applet. JAVA virtual machine 312 is any program capable of running a JAVA application or similar application program. The JAVA virtual machine (JVM) 312 runs on top of the operating system 308 and runs JAVA bytecode programs. The JAVA virtual machine 312 is "virtual" in the sense that it is implemented through software. Thus, the main difference is that browser 310 typically only runs JAVA applets where JAVA virtual machine (JVM) 312 runs JAVA applications. JAVA applets were designed with security in mind. Therefore, applets cannot do certain functions that can be risky from a security standpoint. This includes the ability to read or write to local files. JAVA applications are not so limited. In the present invention, a limited subset of the semiconductor furnace 110 controls will be running on handheld device 102 as either a JAVA applet or JAVA application. If JAVA applets are provided, a browser program 310 will typically be used. If a JAVA application is used, the JVM 312 will be utilized. While the use of JAVA has been mentioned in these examples, this is for exemplary purposes only and other programming languages including C++, Fortran, Visual Basic, assembly language and the like can be utilized.

As discussed earlier, information will be exchanged wirelessly between handheld device 102 and semiconductor furnace 110. This communication can take place in one of several ways.

First, messages and data can be sent over a TCP/IP socket for wireless networking. In this embodiment, both the handheld device 102 and the furnace controller 120 can set up a TCP/IP socket and directly communicate over the socket. Communication over TCP/IP sockets is well known in the art.

Additional to a TCP/IP connection, the remote method invocation can be used. In this communication protocol one side of the link (such as the handheld device side) can call a method or operation on the other side as if it was a local method. Thus, the user of a handheld device could invoke (call) a method residing on the furnace control station, causing an action to occur (such as moving of the robot arm). The advantage of this approach is that the method need not be loaded on to the handheld device, thus saving space on the handheld device and increasing efficiency.

Another possible communication method is serialization. Under serialization, a class (a class being the smallest executable part of the program) is sent to the handheld device 102 for execution on the handheld device. Multiple classes can be sent at different times or the same time.

Additionally, if the applet or application needs specific data, a listener can be employed. Part of the listener will be present in the handheld device (the actual listener) and another part will be present in the furnace controller (the informer). A listener will monitor for the occurrence of certain data and "push" the information to the handheld unit. The information that is "pushed" to the handheld unit can be any information such information regarding plant parameters.

Figure 4:
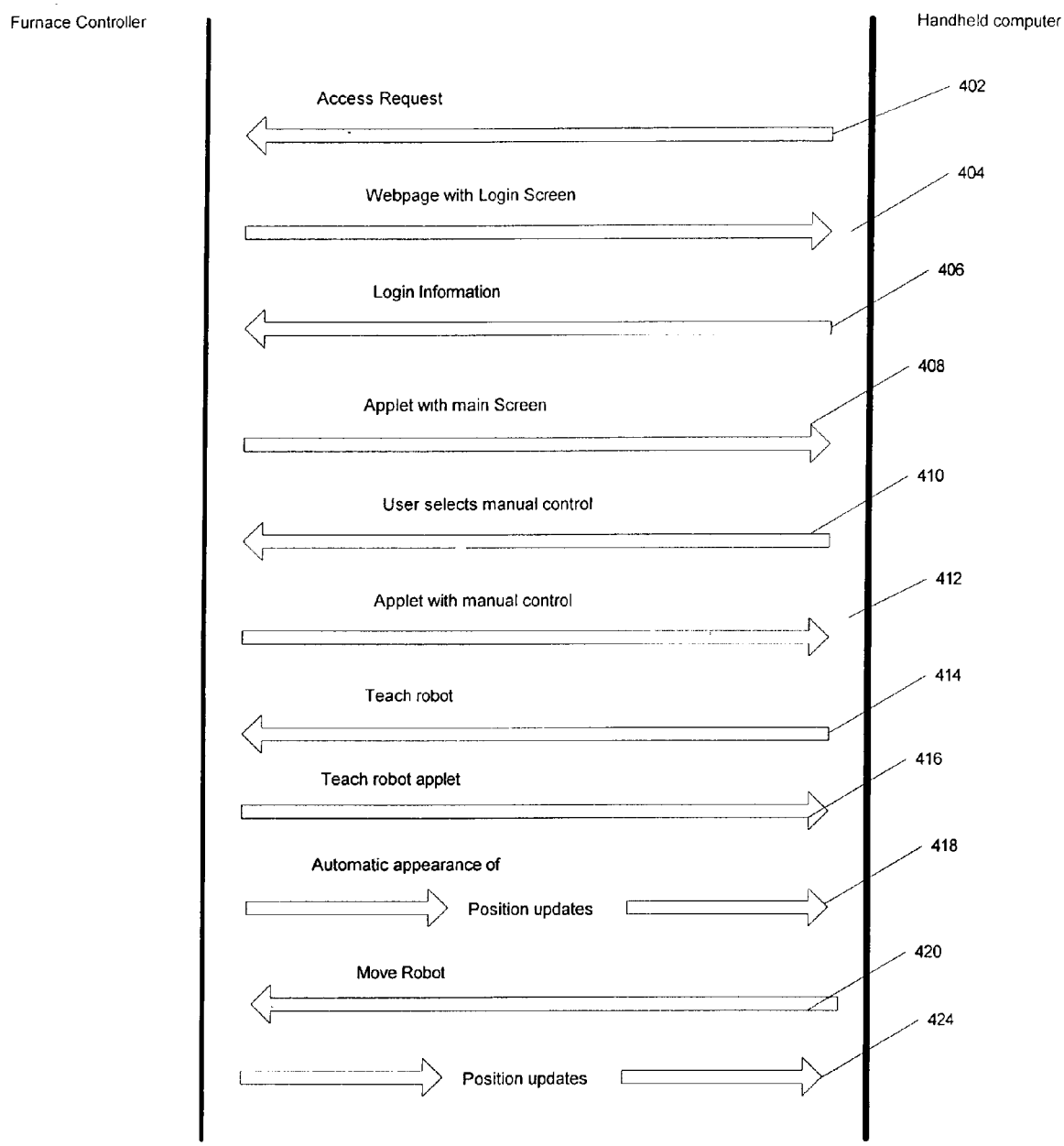
FIG. 4 is an information flow diagram showing the flow of information between the handheld device and the semiconductor furnace for an applet case.
Figure 5:
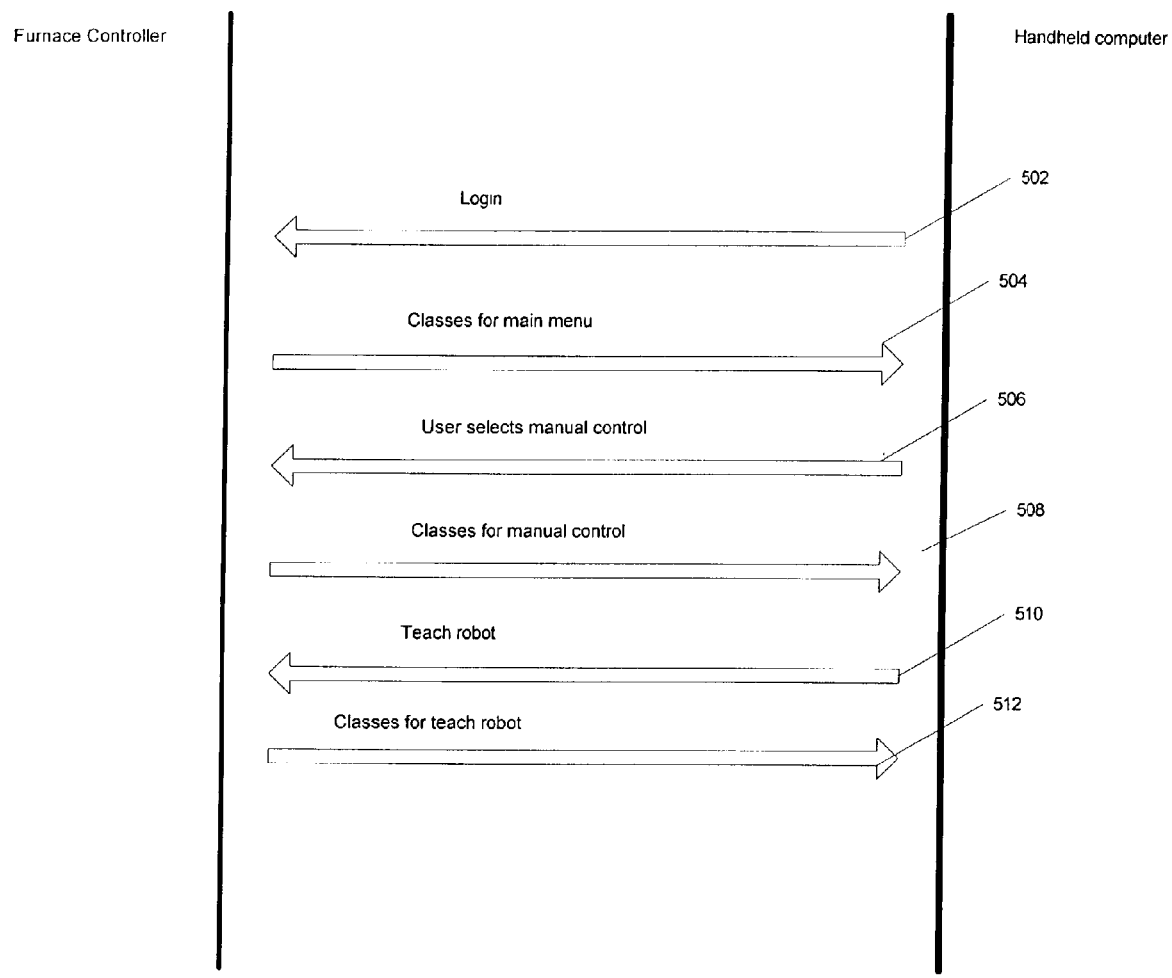
FIG. 5 is a data flow diagram of the present invention for the case where a JAVA virtual machine is used.

In the next two figures, FIG. 4 and FIG. 5, an embodiment for using handheld device 102 with a browser to download applets and an embodiment utilizing Java Virtual Machine to receive classes for the Java application to be executed on the Java Virtual Machine are disclosed. Common to both of these is that at least some of the information and data required to control the semiconductor furnace or other apparatus is sent when needed and is not preloaded on the handheld device 102. This allows for easier updating of software since updates need only occur to the software sent to the handheld device. However, it is possible to have all of the information and data needed to control the semiconductor furnace or other device preloaded on a handheld device 102.

FIG. 4 is an information flow diagram showing the flow of information between the handheld device 102 and the semiconductor furnace 110. In FIG. 4, a browser 310 is used. In a first step 402, handheld device 102 requests to start the maintenance procedure by requesting access to the furnace controller 120 in order to access the furnace control applet. A login screen is returned by furnace controller in step 404. The user inputs the login information and sends it in step 406. Login information includes information necessary to be granted access to the furnace controller 120 including user name and password. This information is optionally encrypted. In step 408 an applet that includes a main screen of choices is sent to the handheld device 102. These choices include manual control of the furnace controller, diagnostic information and status information. The user makes a selection from the choices and, in this case, selects the manual control of the apparatus in step 410. A second applet with various manual control functions is sent to the handheld device in step 412. In step 414, the user chooses an option to teach the robot and the selection is sent. A "teach robot" applet is then sent in step 416. This applet will send the position of the robot automatically to the handheld device in step 418 and can be updated at regular intervals. A user can issue on the handheld device 102 a command to move the robot in step 420. This command is then received by the furnace controller 120, which then issues the command to the robot controller. The robot is then moved and the user can verify the movement visually. The robot position is updated for the handheld device in step 422. While this embodiment involved the loading of multiple applets, a single applet could be loaded that provided the functionality of all of the multiple applets. One reason to use multiple applets is to reduce the amount of information to send the handheld device 102 at any one time.

An advantage of this approach is that applets are not sent to the handheld device 102 until needed, thus saving storage space on the handheld device 102. Also, only a subset of the controls is sent to and present on the handheld unit at any one time, thus allowing for faster operations then if the entire controls were reproduced on a wireless unit. Additionally, since the applets are not loaded until needed, updates only need to be done to the applets and not to the handheld device 102. The handheld device 102 is assured of always having the latest software when the applets are loaded.

FIG. 5 is a data flow diagram of the present invention for the case where the JAVA virtual machine is used with JAVA applications. In FIG. 5, the user requests the start of a maintenance sequence by sending a login request from the handheld device in step 502. The classes for the main menu are sent to the handheld device 102 in step 504. The user then chooses an option for "manual control" in step 506 and the classes for manual control are sent in step 508. Other options may also be presented at the time including ones for diagnostic routines and status information requests. The user then selects teach robot in step 510 and the teach robot classes are sent in step 512. The process continues the same as in FIG. 4 after that with the adjustment of the robots. In this embodiment, certain classes may be initially loaded onto the handheld device 102. These initial classes may include classes for the login application, encryption and general communication functions. Also, all classes needed could be downloaded at one time.

In both these examples, the teaching and adjustment of the robot was used as an example. The invention is not limited to such an example. The invention can be used in many other areas such as the remote monitoring of process parameters during operations, the remote control of processing and the like. Additionally, the invention is not limited solely to the use in semiconductor furnaces, but can be used in any semiconductor processing apparatus or industrial apparatus that is provided with an apparatus controller.

What is claimed:

1. An apparatus comprising:
   a. machinery for performing an industrial process having process parameters;
   b. a controller operative with a provided wireless device, the wireless device comprising a processor, a memory, a user interface, and a transceiver, the controller responsive to a set of commands, the controller performing a first method including:
      receiving a request in accordance with a user selection;
      sending instructions to be stored in the memory for performance by the processor, the instructions for performing a second method limited to a subset of the commands, the second method including:
         (1) obtaining via the user interface indicia of a command of the subset; and
         (2) communicating via the transceiver in accordance with the indicia of the command;
      receiving data in response to communicating by the transceiver; and
      controlling the machinery in accordance with the received data;
   c. wherein the controller comprises at least two subcontrollers, each subcontroller comprising one of a master control station, a process controller, a temperature controller, and a robot controller; and
      the commands comprising the subset are unique to at least one of the subcontrollers.

2. The apparatus of claim 1 wherein the first method further comprises sending data to the wireless device to enable the processor, in response to the data, to present via the user interface a plurality of selections and to obtain the user selection.

3. The apparatus of claim 1 wherein the instructions comprise a JAVA applet.

4. The apparatus of claim 1 wherein the instructions comprise a JAVA application.

5. The apparatus of claim 1 further comprising sending indicia of the process parameters to be presented via the user interface to assist provision by the user of the indicia of the command.

6. A method for machinery control, the machinery comprising a controller in wireless communication with a provided wireless device, the wireless device comprising a processor, a memory, a user interface, and a transceiver, the controller responsive to a set of commands, the method performed by the controller comprising:
   receiving a request in accordance with a user selection;
   sending instructions to be stored in the memory for performance by the processor, the instructions for performing a second method limited to a subset of the commands, the second method including:
      (1) obtaining via the user interface indicia of a command of the subset; and
      (2) communicating via the transceiver in accordance with the indicia of the command;
   receiving data in response to communicating by the transceiver; and
   controlling the machinery in accordance with the received data;
   wherein the controller comprises at least two subcontrollers, each subcontroller comprising one of a master control station, a process controller, a temperature controller, and a robot controller; and
   the commands comprising the subset are unique to at least one of the subcontrollers.

7. The method of claim 6 further comprising sending data to the wireless device to enable the processor, in response to the data, to present via the user interface a plurality of selections and to obtain the user selection.

8. A memory device comprising instructions for performing the method of claim 7.

9. The method of claim 6 further comprising sending indicia of the process parameters to be presented via the user interface to assist provision by the user of the indicia of the command.

10. A memory device comprising instructions for performing the method of claim 9.

11. The method of claim 6 wherein a maintenance sequence directs movement of the machinery.

12. A memory device comprising instructions for performing the method of claim 11.

13. The method of claim 6 wherein the maintenance sequence is for teaching a robot.

14. A memory device comprising instructions for performing the method of claim 13.

15. A memory device comprising instructions for performing the method of claim 6.

16. An apparatus comprising:
    a. machinery for performing an industrial process having process parameters;
    b. a controller configured to control machinery through a set of commands, the controller operative with a provided wireless device, the wireless device comprising a processor, a memory, a user interface, and a transceiver, the controller performing a first method including:
       receiving a request from the wireless device in accordance with a user selection, the request defining a subset of the commands;

sending the subset of the commands to the wireless device, the subset to be stored in the memory for the performance of a second method by the wireless device, the second method including:
  (1) obtaining via the user interface indicia of a command of the subset; and
  (2) communicating via the transceiver in accordance with the indicia of the command;
receiving the indicia of the command; and
controlling the machinery in accordance with indicia of the command.

17. A method for machinery control, the machinery comprising a controller in wireless communication with a provided wireless device, the wireless device comprising a processor, a memory, a user interface, and a transceiver, the controller provided with a control program to control the machinery, the method performed by the controller comprising:

a. receiving a request from the wireless device in accordance with a user selection, the user selection defining a subset of the control program;
b. sending the subset of the control program to the wireless device, the subset to be stored in the memory for the performance of a second method by the wireless device, the second method including:
  (1) obtaining via the user interface indicia of a command of the subset; and
  (2) communicating via the transceiver data in accordance with the indicia of the command;
c. receiving the data in response to the communicating by the transceiver; and
d. controlling the machinery in accordance with the received data.

* * * * *